(12) United States Patent
Yamashita et al.

(10) Patent No.: US 8,521,400 B2
(45) Date of Patent: Aug. 27, 2013

(54) COMBUSTION APPARATUS AND METHOD FOR COMBUSTION CONTROL

(75) Inventors: Akihito Yamashita, Fuji (JP); Mitsutaka Inaba, Fuji (JP); Jun Aiso, Fuji (JP)

(73) Assignee: Purpose Company Limited, Fuji-shi, Shizuoka (JP)

( * ) Notice: Subject to any disclaimer, the term of this patent is extended or adjusted under 35 U.S.C. 154(b) by 609 days.

(21) Appl. No.: 12/820,612

(22) Filed: Jun. 22, 2010

(65) Prior Publication Data

US 2011/0313637 A1    Dec. 22, 2011

(51) Int. Cl.
*F02D 41/00* (2006.01)
*G01M 15/00* (2006.01)

(52) U.S. Cl.
USPC ........................................ 701/103

(58) Field of Classification Search
USPC ............... 701/103, 105, 101, 102; 73/114.2; 123/198 F, 406.13, 406.14, 406.27, 550, 123/547, 551
See application file for complete search history.

(56) References Cited

U.S. PATENT DOCUMENTS

| 3,938,937 | A | * | 2/1976 | Matthews | 431/78 |
| 5,037,292 | A | * | 8/1991 | Steiert | 431/18 |
| 5,247,910 | A | * | 9/1993 | Abe | 123/688 |
| 5,350,114 | A | * | 9/1994 | Nelson et al. | 237/2 A |
| 6,745,558 | B2 | * | 6/2004 | Murakami et al. | 60/39.281 |

FOREIGN PATENT DOCUMENTS

| JP | 57-202420 A | 12/1982 |
| JP | 60-122827 A | 7/1985 |

* cited by examiner

*Primary Examiner* — Hieu T Vo
(74) *Attorney, Agent, or Firm* — Westerman, Hattori, Daniels & Adrian, LLP (57) ABSTRACT

A combustion apparatus (water heater) includes a combustion unit (burner) combusting fuel, at least two flame detector (flame rods) detecting whether there is a flame or not in the combustion unit, a determination unit (control device) determining whether or not there is a misfire, based on detected results of the flame detectors, and a control unit (control device) stopping supply of the fuel to the combustion unit in response to a determined result of the determination unit.

24 Claims, 12 Drawing Sheets

COMBUSTION APPARATUS AND METHOD FOR COMBUSTION CONTROL

BACKGROUND OF THE INVENTION

1. Field of the Invention

The present invention relates to a combustion apparatus that monitors combustion of a burner and a method for combustion control.

2. Description of the Related Art

Conventionally, a combustion apparatus is known using a flame rod which detects whether there is a flame, as a monitoring means of combustion of a burner that is a combustion means.

Concerning such monitoring of combustion, a gas water heater is known that in case a circuit detecting a spark signal of a plug or a flame detecting circuit using a flame rod is anomalous, an exhaust fan or an igniter is not brought to an operation by a safety circuit (for example, Japanese Laid-open Patent Publication No. 57-202420).

A flame detecting means of a combustion apparatus detects an ignition failure, going out during the combustion, etc. and thereby, unburnt raw gas is prevented from being emitted. If a flame rod or the like which is the flame detecting means breaks during the combustion operation although having operated normally before or at the start of the combustion operation, the condition that there is a flame may be left detected. If a burner of the combustion apparatus is misfired because a strong wind blows, supply of combustion gas stops, etc. in the above state, and the condition that there is a flame is left detected regardless of no flame. Thus, there occurs a problem such as emission of raw gas.

Concerning such a problem, there is no disclosure nor suggestion thereof in Japanese Laid-open Patent Publication No. 57-202420, and no disclosure nor suggestion about the structure, etc. for solving it is presented.

SUMMARY OF THE INVENTION

An object of the present invention is to provide a combustion apparatus in which the accuracy of monitoring combustion during the heating operation is enhanced, and a method for combustion control.

To achieve the above object, the present invention is a combustion apparatus including a combustion means, flame detecting means, a determination unit and a control unit. The combustion means combusts fuel. The flame detecting means are at least two, and detect whether there is a flame or not in the combustion means. The determination unit determines whether or not to be a misfire based on detected results of the flame detecting means. The control unit stops supply of the fuel to the combustion means in response to a determined result of the determination unit.

The combustion apparatus of the present disclosure may further include a timing means, wherein the determination unit may determine a misfire if one of the flame detecting means detects a flame and the other flame detecting means has not detected a flame for a predetermined time.

In the combustion apparatus of the present disclosure, at least one of the flame detecting means may include a current detecting means detecting a value of current which passes through a flame, and the determination unit may determine that there is not a flame in the combustion means if the value of current detected is under a threshold value.

The combustion apparatus of the present disclosure may further include an informing means informing a state of the combustion apparatus, wherein the determination unit may output a determined result of flame detection anomaly if at least one of the flame detecting means detects a flame after a predetermined time has passed since the supply of the fuel to the combustion means was stopped or before combustion of the combustion means is started, and wherein the informing means may inform the determined result. The control unit may execute a re-ignition process if at least one of the flame detecting means does not detect a flame after a predetermined time has passed since the supply of the fuel to the combustion means was stopped.

To achieve the above object, a combustion control method of the present disclosure includes detecting, determining and stopping. In the detecting, it is detected whether or not there is a flame in a combustion means which combusts fuel by at least two flame detecting means. In the determining, it is determined whether or not to be a misfire based on detected results of the flame detecting means. In the stopping, supply of the fuel to the combustion means is stopped in response to a determined result.

The combustion control method may further include timing passing time by a timing means, and determining a misfire if a predetermined time has passed since one of the flame detecting means detects a flame and the other flame detecting means does not detect a flame.

The combustion control method of the present disclosure may further include detecting a value of current which passes through a flame, and determining that there is not a flame in the combustion means if the value of current detected is under a threshold value.

The combustion control method of the present disclosure may further include outputting a determined result of flame detection anomaly if at least one of the flame detecting means detects a flame after a predetermined time has passed since the supply of the fuel to the combustion means was stopped or before combustion of the combustion means is started, and informing the determined result by an informing means. Executing a re-ignition process if at least one of the flame detecting means does not detect a flame after a predetermined time has passed since the supply of the fuel to the combustion means was stopped, may also be included.

The features and advantages of the combustion apparatus and the method for combustion control of the present invention as described above are listed as follows.

(1) A flame is detected by a plurality of flame detecting means and combustion is determined. Control such that the combustion is stopped is executed based on the determined result. Thereby, the monitoring accuracy can be enhanced and the safety of a combustion apparatus can be improved.

(2) Flame detection is executed by at least two flame detecting means. Even if one of the flame detecting means brakes during the combustion operation, the determination is made in consideration of the detected result by the other flame detecting means. Thereby, a misfire can be detected and the safety can be improved.

(3) Flame detection is executed by a plurality of flame detecting means. Each flame detecting means uses a different detection criterion. Thereby, the enhancement of the accuracy of monitoring combustion can be achieved.

Other objects, features and advantages of the present invention are more clearly understood by referring to the attached drawings and each of embodiments.

DETAILED DESCRIPTION OF THE PREFERRED EMBODIMENTS

First Embodiment

In a first embodiment, a flame of a burner during combustion operation is detected using at least two flame detecting means in a water heater that executes heat exchange by combustion exhaust air generated by the burner. Combustion is determined based on the detected results. If the determined result tells combustion, combustion control is executed. The embodiment presents a case of using two flame detecting means.

Figure 1:
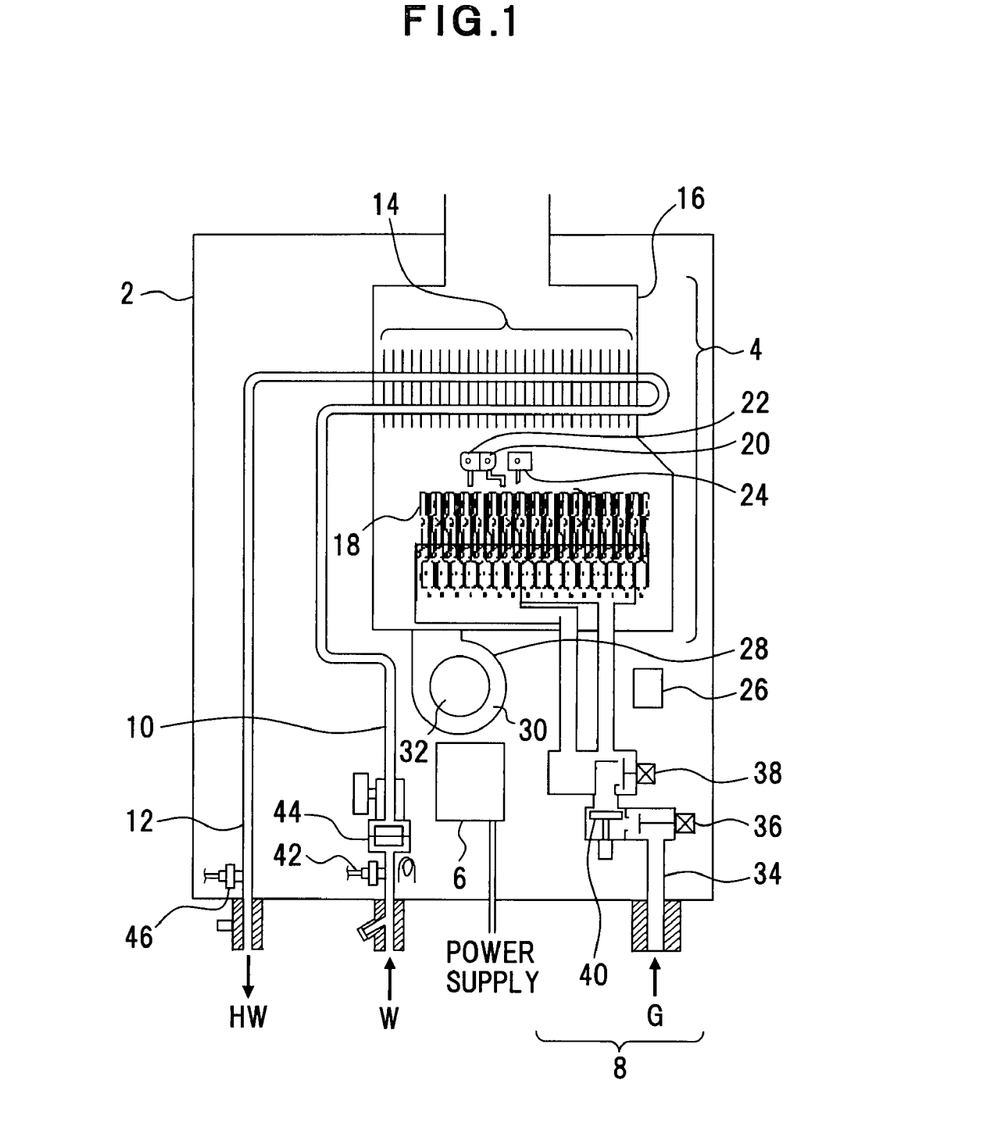
FIG. 1 depicts an example of a water heater according to a first embodiment.

The first embodiment will be described with reference to FIG. 1. FIG. 1 depicts an example of a water heater according to the first embodiment. A structure depicted in FIG. 1 is an example, and does not limit the embodiment.

A water heater 2 is an example of the combustion apparatus and the method for combustion control thereof of the present disclosure and provides a heat source device 4, a control device 6, a fuel supply part 8, etc. A water supply pipe 10, a hot water outgoing pipe 12, a heat exchanger 14, etc. are also provided as means for exchanging heat with exhaust air generated from the heat source device 4, heating tap water W and making hot water HW flow out.

The heat source device 4 is an example of a means for burning fuel gas G, etc. and generating exhaust air of a high temperature. The heat source device 4 may provide a case 16 that guides exhaust air to the ceiling of the water heater 2 without diffusing the exhaust air outside, a burner 18, flame rods 20 and 22 that are flame detecting means, a spark plug 24, an igniter 26 and an air supply unit 28.

The burner 18 is an example of a combustion means and is a means for burning the fuel gas G supplied from the fuel supply part 8 and generating exhaust air. The combustion of the burner 18 is controlled by the control device 6 based on, for example, the flow rate of supplied water W, for which heat exchange is executed, and a set temperature.

The flame rod 20 (FRA) is an example of a first flame detecting means, is disposed in the vicinity of the burner 18, and monitors combustion thereof. For the flame rod 20, for example, a rod made of heat resistant steel is provided and it is detected whether there is a flame or not using the operation of electrical conduction of a flame. For example, if electric current can be detected by the flame rod 20, it is determined that there is a flame and to be in a combustion state.

Figure 6:
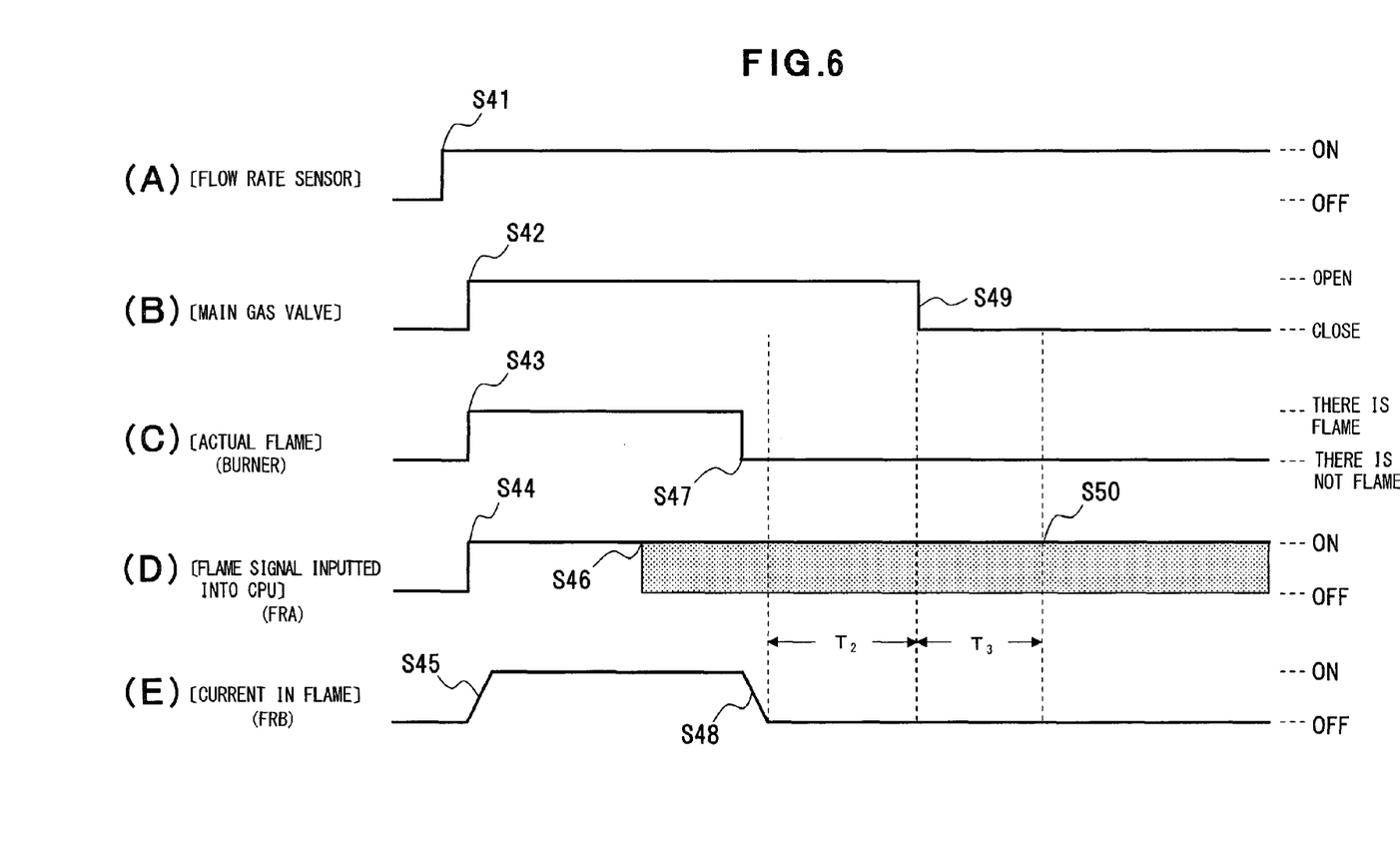
FIG. 6 depicts timings of detection of the combustion apparatus.

The flame rod 22 (FRB) is an example of a second flame detecting means. For the flame rod 22, an air-fuel ratio rod may be used that measures the mixture ratio of the weight of air to the weight of fuel during combustion and further, measures concentrations of carbon monoxide and the blocking ratio at an exhaust air in the heat source device 4. The air-fuel ratio rod detects a value of FR current passing through a flame, and detects an air-fuel ratio, etc. based on the current value. Flame detection of the burner 18 is executed based on the current value detected by the flame rod 22 (FIG. 6).

Thereby, while the first flame detecting means detects whether there is an electrified state based on the presence of a flame, the second flame detecting means detects whether there is a flame based on a detected current value. Both of them execute flame detection using different detection criteria. Detected results thereof are outputted to the control device 6 that is a determination unit.

The spark plug 24 is an example of an ignition means for the burner 18, and connected to the igniter 26 that executes ignition control. The igniter 26 is an example of an ignition device under electric control, and a means allowing a spark plug to discharge at a predetermined timing according to a combustion control process.

The air supply unit 28 is an example of a means supplying combustion air to the burner 18, and provides an intake fan 30 and a fan motor 32, for example.

The control device 6 is an example of not only a control unit executing combustion control of the burner 18, supply control of fuel gas, rotation control of the fan motor 32, etc. but also a determination unit, and may provide a control substrate. Detection information detected by the flame rods 20 and 22 is taken into the control device 6, and combustion of the burner 18 is determined. Thus, a combustion state such as a misfire of the burner 18 is monitored. If the burner 18 is misfired, a main gas valve 36 is closed and fuel supply to the burner 18 is stopped, for example. The control device 6 may be connected to an external power source, and electric power of the water heater 2 is supplied.

The fuel supply part 8 is an example of a means supplying the fuel gas G, etc. to the burner 18, and a gas supply pipe 34 is installed therein. The fuel gas G is supplied to the burner 18 by the main gas valve 36 in the gas supply pipe 34 being opened and a gas solenoid valve 38 being opened. The amount of the supplied fuel gas G, that is, the amount of combustion is controlled according to the degree of opening a gas proportional valve 40.

The water supply pipe 10 is provided for the water heater 2 as a means taking in the tap water W from a water tap, etc. The tap water W is introduced into the heat exchanger 14 disposed in the heat source device 4 via the water supply pipe 10, and is heat-exchanged with combustion exhaust air generated by the burner 18. The hot water HW heated by the heat exchange is allowed to flow out from the water heater 2 via the hot water outgoing pipe 12 connected to an outlet of the heat exchanger 14.

The water supply pipe 10 provides an entrance water temperature sensor 42 that detects an entrance temperature of the tap water W, a flow rate sensor 44 that detects the flow rate of the tap water W, etc. The hot water outgoing pipe 12 provides an outgoing hot water temperature sensor 46 that detects an outgoing temperature of the hot water HW, etc. The water heater 2 is equipped with a downstream shutoff valve such that a faucet or a shower is attached to the end of a hot water outgoing pipe. Detecting the flow of the tap water W by the flow rate sensor 44 starts combustion of the burner 18, and the water heater 2 supplies hot water. Since the amount of the combustion of the burner 18 is properly adjusted in water heating control based on information such as an entrance water temperature, the amount of entrance water and an outgoing hot water temperature, the number of the burners 18 and the amount of the supplied fuel gas G may be controlled.

Figure 2:
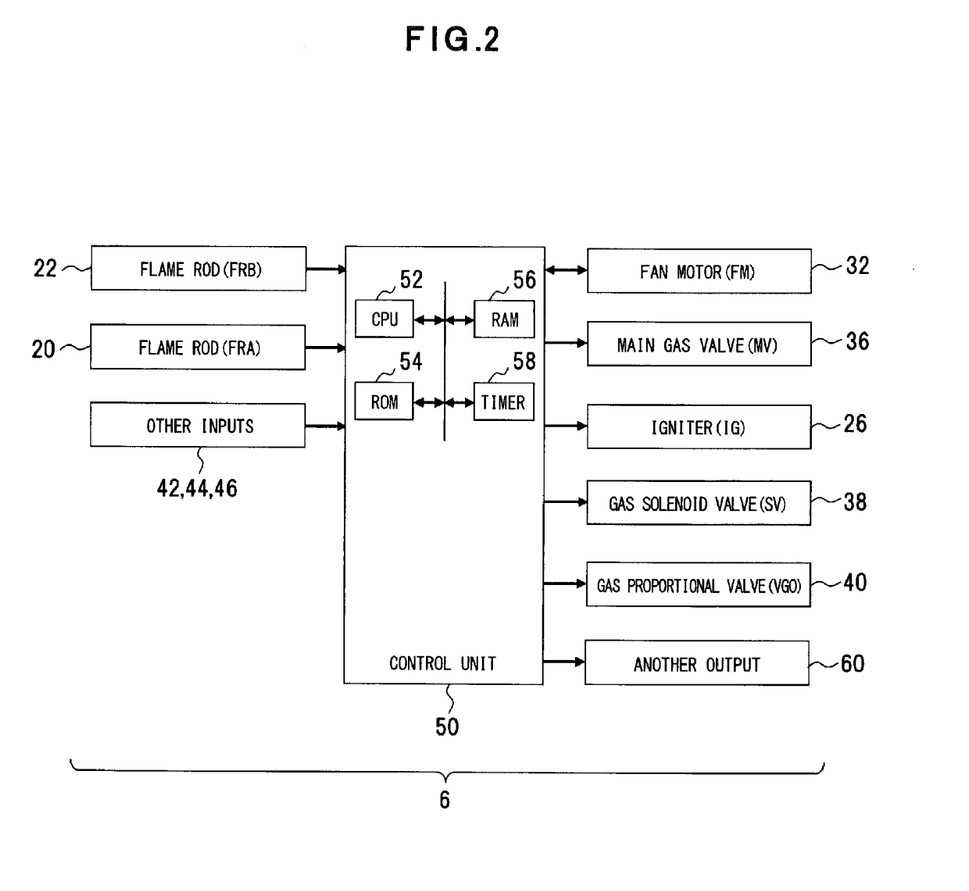
FIG. 2 depicts an example of a control unit of a combustion apparatus.

The control device 6 will be described with reference to FIG. 2. FIG. 2 depicts an example of a structure of the control device.

The control device 6 provides a control unit 50 configured by a microcomputer, and also provides an input circuit taking in detection information, etc., a calculation means executing various calculations, a storage means storing a control program, etc., an output circuit outputting a control signal, and so on. The control unit 50 provides CPU (Central Processing Unit) 52, ROM (Read-Only Memory) 54 and RAM (Random-Access Memory) 56 as examples of the storage means, a timer 58, etc. The CPU 52 is an example of the calculation means. The CPU 52 performs a flame determination process by executing a control program in the ROM 54 and combustion control on the basis of a result of the flame determination, and generates a control output based on a detected temperature, etc. The RAM 56 configures an execution area for a program. The timer 58 is an example of a timing means, and times the passage of time for a flame detecting process. The timer 58 also times the passage of time such as a pre-purge time, an ignition delay time or a post-purge time of water heating control described later.

The control device 6 is an example of a determination unit and a control unit of the water heater 2. For example, the presence or absence of FR current and, if FR current is present, measured value information of the current are inputted from the flame rods 22 and 20 to the control device 6 as flame detecting information. The rotating number information, etc. is also inputted thereto from the fan motor 32 of the air supply unit 28. The control device 6 outputs control information based on these pieces of inputted information to the fan motor 32, the main gas valve 36, the igniter 26, the gas solenoid valve 38, the gas proportional valve 40, etc.

The example of the structure executing the flame detecting process of the water heater 2 is depicted in FIG. 2 as the structure of the control device 6. The structure is not limited thereto. That is, detection information of the entrance water temperature sensor 42, the flow rate sensor 44, the outgoing hot water sensor 46, etc. is inputted to the control device 6 as other inputs for executing water heating control and combustion control of the burner 18. A control output based on the inputted information is outputted to the fan motor 32, the gas solenoid valve 38 and an informing means such as a speaker, a buzzer and a display unit as another output 60.

Figure 3:
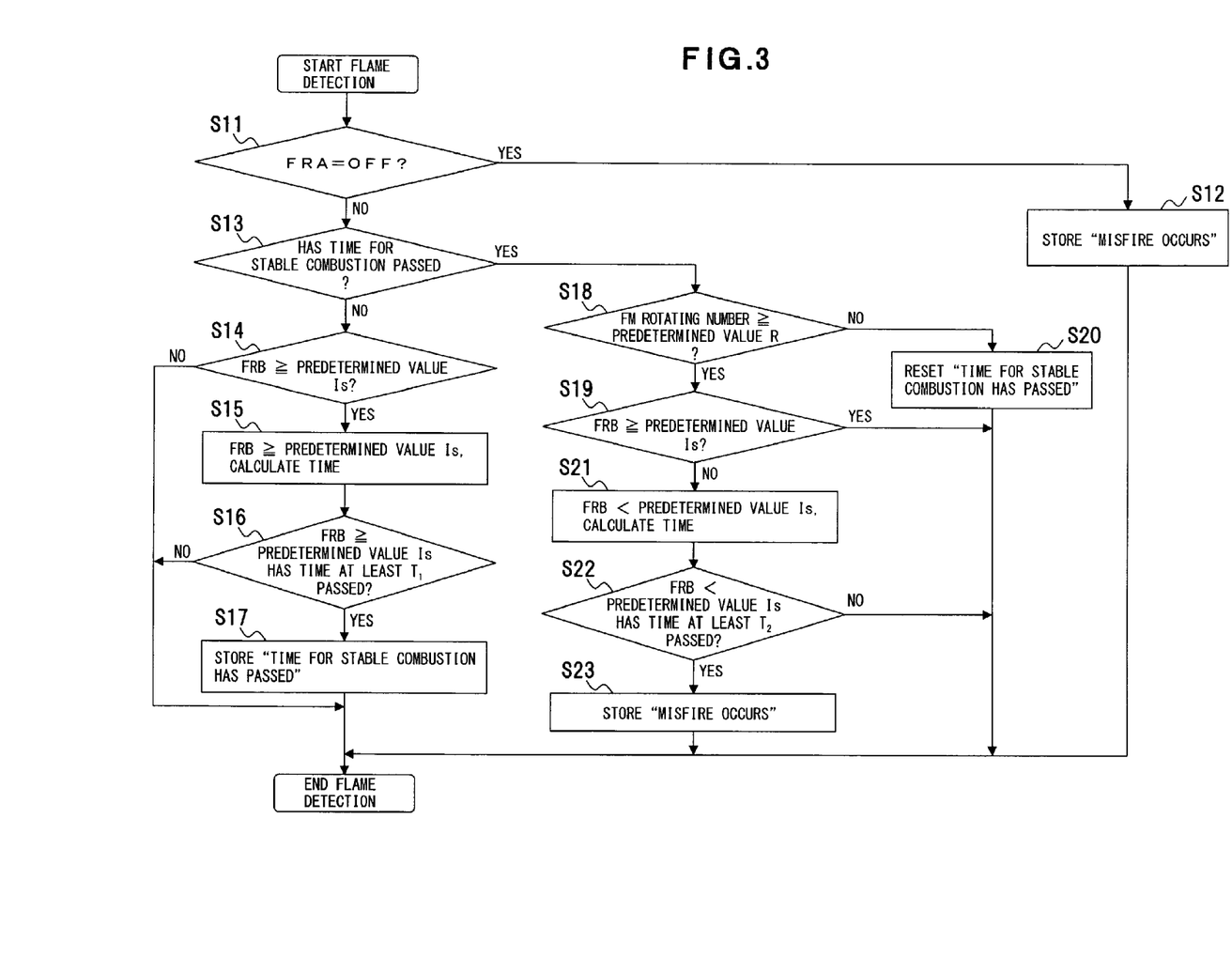
FIG. 3 depicts an example of a flame detecting process of the combustion apparatus.
Figure 4:
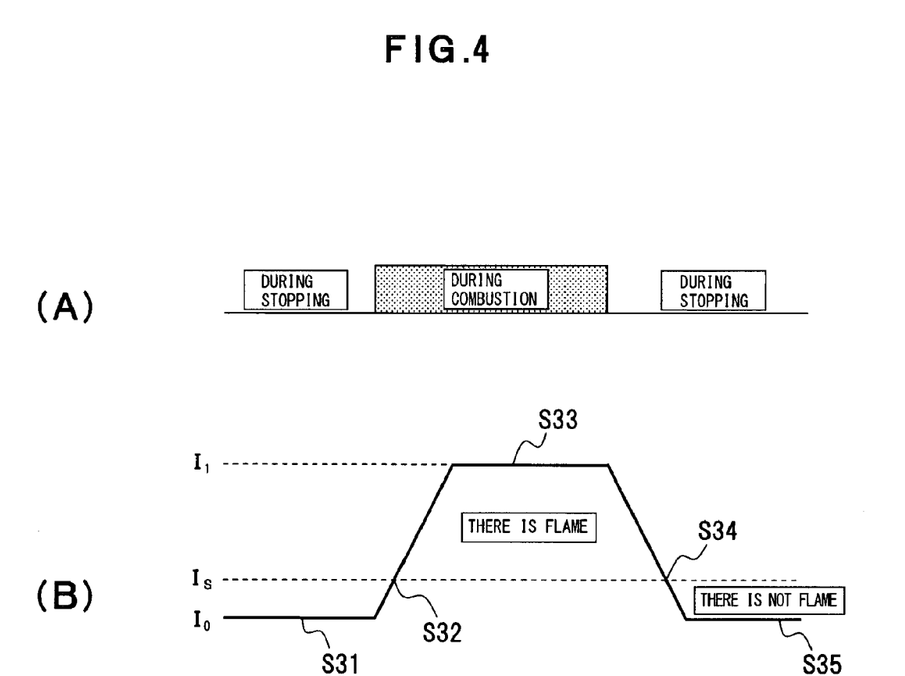
FIG. 4 depicts the principles of flame detection using a flame rod.
Figure 5:
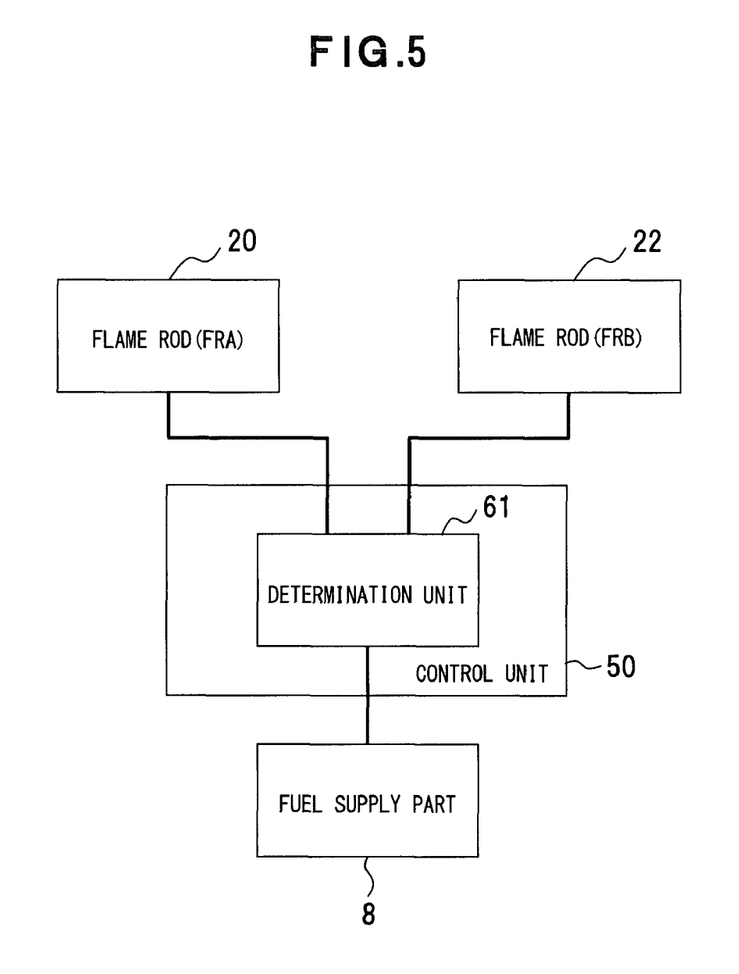
FIG. 5 depicts a control process based on a result of flame detection.

The flame detecting process of the water heater will be described with reference to FIGS. 3, 4, 5 and 6. FIG. 3 is a flowchart depicting an example of the flame detecting process, FIG. 4 depicts the principles of flame detection using the second flame rod (FRB), FIG. 5 depicts a control process based on a result of flame detection and FIG. 6 depicts timings of detection of the combustion apparatus. Control processing contents, processing procedures, etc. depicted in FIGS. 3, 4, 5 and 6 are an example, and do not limit the embodiment.

This flame detecting process is an example of a combustion control method, and executed during water heating combustion of the heat source device 4. When it is determined by flame detection of the first flame detecting means that there is a flame, flame detection by the second detecting means is executed. FRA, which is the first flame detecting means, is configured by the flame rod 20 for flame detection. Whether there is a flame or not is determined depending on ON or OFF of FR current. FRB, which is the second flame detecting means, is configured by the flame rod 22 for air-fuel ratio control. Whether there is a flame or not is determined based on a detected value of FR current.

After combustion is started, the flame detecting process by FRA is executed. When a flame is not detected, that is, when FR current is detected as OFF at the flame rod 20 (YES of step S11), the control device 6 determines that a misfire occurs, and a determined result thereof is allowed to be stored into, for example, the ROM 54 that is a storage unit (step S12). In this time, a storage area may be formed for storing the determined result of combustion, or a table for control may be provided for being allowed to store a determined result and used for combustion control in the ROM 54.

If a misfire is determined by the flame detecting process of FRA, the flame detecting process is ended. In short, since FRA can detect a misfire during water heating combustion, combustion control may be executed on the premise that FRA operates normally.

If FRA detects ON (NO of step S11), the process moves to detection by FRB. The flame rod 22 determines whether time for stable combustion has passed or not (step S13). As to the determination whether time for stable combustion has passed, it needs a certain time passage for a response to detecting a value of FR current by the flame rod 22. After time for stable combustion has passed, the process moves to flame determination.

FIG. 4(A) depicts a combustion state of the burner 18. FIG. 4(B) depicts a detected result of a current value by the flame rod 22 (FRB) for the combustion state of the burner 18. When combustion of the burner 18 is being stopped, a current value of $I_0$ is detected by FRB (step S31). When the combustion of the burner 18 is started, the current value increases gradually, and reaches a current value when the combustion is stopped plus 1 [μA] for example, if a threshold value is Is (step S32). When a current value over the threshold value Is is detected, it is determined there is a flame (step S33).

When the combustion of the burner 18 is stopped, the value of current detected by FRB decreases. If the current value is under the threshold value Is (step S34), it is determined there is not a flame.

When time for stable combustion has not passed (NO of step S13), the FR current value detected by FRB is referred. It is determined whether the detected current value is equal to or over 1 [μA] if the threshold value is Is (step S14). When the current value is equal to or over the threshold value Is (YES of step S14), passage time therefor is calculated (step S15). If, for example, at least 5 [seconds] has passed as a predetermined time $T_1$ that is a continuous time under the condition where the current value is equal to or over Is (YES of step S16), it is determined that time for stable combustion has passed, and information thereon is stored to, for example, the storage unit such as the ROM 54 (step S17). Thereby, the first time of flame detection is ended.

If the value detected by FRB is not equal to or over the predetermined value Is (NO of step S14) or if the continuous time $T_1$ has not passed even if the value is equal to or over Is (NO of step S16), the first time of flame detection is also ended. In water heating control of the water heater 2, various control processes including the flame detection process are repeatedly executed as described below.

When the information that time for stable combustion has passed is stored in the storage unit in case of, for example, the second time of flame detection, the process moves to determination whether the rotating number of the fan motor (FM) 32 is equal to or over a predetermined value R (step S18) after it is determined that time for stable combustion has passed in FRB (YES of step S13). If the rotating number of the fan motor 32 is equal to or over the predetermined value R (YES of step S18), it is determined whether a current value detected by FRB is equal to or over the predetermined value Is (step S19). The determination of the rotating number of the fan motor 32 is executed so as not to determine that it is occurrence of a misfire that when the amount of the combustion of the burner 18 is small, the current value detected by FRB decreases. Thus, if the rotating number of the fan motor 32 is under the predetermined value R (NO of step S18), the information that time for stable combustion has passed is reset (step S20), and the above flame detecting process is ended.

If the current value detected by FRB is equal to or over the predetermined value Is (YES of step S19), the flame detecting process is ended because of showing that a flame is detected. If the value of FRB is smaller than the predetermined value Is, time passing therefor is calculated (step S21). If the above state continues for a predetermined time $T_2$, for example, at least 6 [seconds] (YES of step S22), occurrence of a misfire is determined, information on the misfire is stored to the storage unit (step S23) and the flame detecting process is ended. Like the above, if a misfire is detected by FRB, a control command that brings the main gas valve 36 in a closed state may be outputted from the control device 6, and fuel supply to the burner 18 may be stopped. It may be informed that FRA is in failure since the determined result of FRA is different from that of FRB.

If the state that the value of FRB is smaller than the predetermined value Is does not continue for at least the predetermined time $T_2$ (NO of step S22), the flame detecting process in this time is ended.

The flame detecting process depicted in FIG. 3 is repeatedly executed during a driving operation of the water heater 2. Next processing step may be executed although one processing step is not completed.

In flame detection only by FRA, or by FRA and FRB, as depicted in FIG. 5, a misfire during combustion driving is determined by the determination unit 61 in the control device 6 based on the above flame detecting result. In response to the determined result, stop control of fuel supply to the burner 18 is outputted from the control unit 50 to the fuel supply part 8.

In this flame detecting process, as depicted in FIG. 6, if water supply to the water heater 2 is detected by the flow rate sensor 44 (Step S41), the main gas valve 36 is opened (step S42) and the burner 18 is ignited (step S43). At this time, it is detected in FRA that there is a flame by detecting FR current (step S44). In FRB, it is detected by the flame rod 22 that an FR current value gradually increases from a current value $I_0$ in a stopped state to $I_1$, and flame detection is made from OFF to ON because the current value is equal to or over the threshold value Is (step S45).

In the combustion driving, if FRA is in failure (step S46), FRA continues to output a detected result that there is a flame. If a misfire occurs at the burner 18 by, for example, a strong wind (Step S47), the detected current value gradually decreases in FRB (step S48). If the current value is under the threshold value $I_0$ as described above, it is determined that there is not a flame, and FRB is made from ON to OFF.

If it is determined that there is not a flame by the detected result of FRB, the main gas valve 36 is closed after the predetermined time $T_2$ has passed (step S49) and fuel supply is stopped. In the control device 6, if there is a signal representing that there is a flame from FRA after a predetermined time T3, for example 5 seconds since fuel supply is stopped (step S50), it may be determined that there is an error.

In case that the current value in a flame detected by FRB is under the predetermined value Is during the combustion driving and the combustion is once stopped (step S49), re-ignition may be executed when the current value in a flame is equal to or over the threshold value Is after step S49.

According to such a structure, a flame is detected by a plurality of flame detecting means and combustion is determined. Stopping the combustion based on a determined result thereof can prevent an error of monitoring the combustion. Thus, the safety of a combustion apparatus can be improved. Even if some of the flame detecting means brake during a combustion operation, a misfire can be detected. Thus, the safety can be improved. Flame detection is executed by a plurality of flame detecting means. Each flame detecting means uses a different detection criterion. Thereby, enhancement of the accuracy of monitoring combustion can be achieved. Another flame rod which is already provided for the water heater 2 is used to enable flame detection. Thus, new sensor may not be provided.

Second Embodiment

A second embodiment will describe a case of executing the above mentioned flame detecting process in a water heating control process of a water heater.

Figure 7:
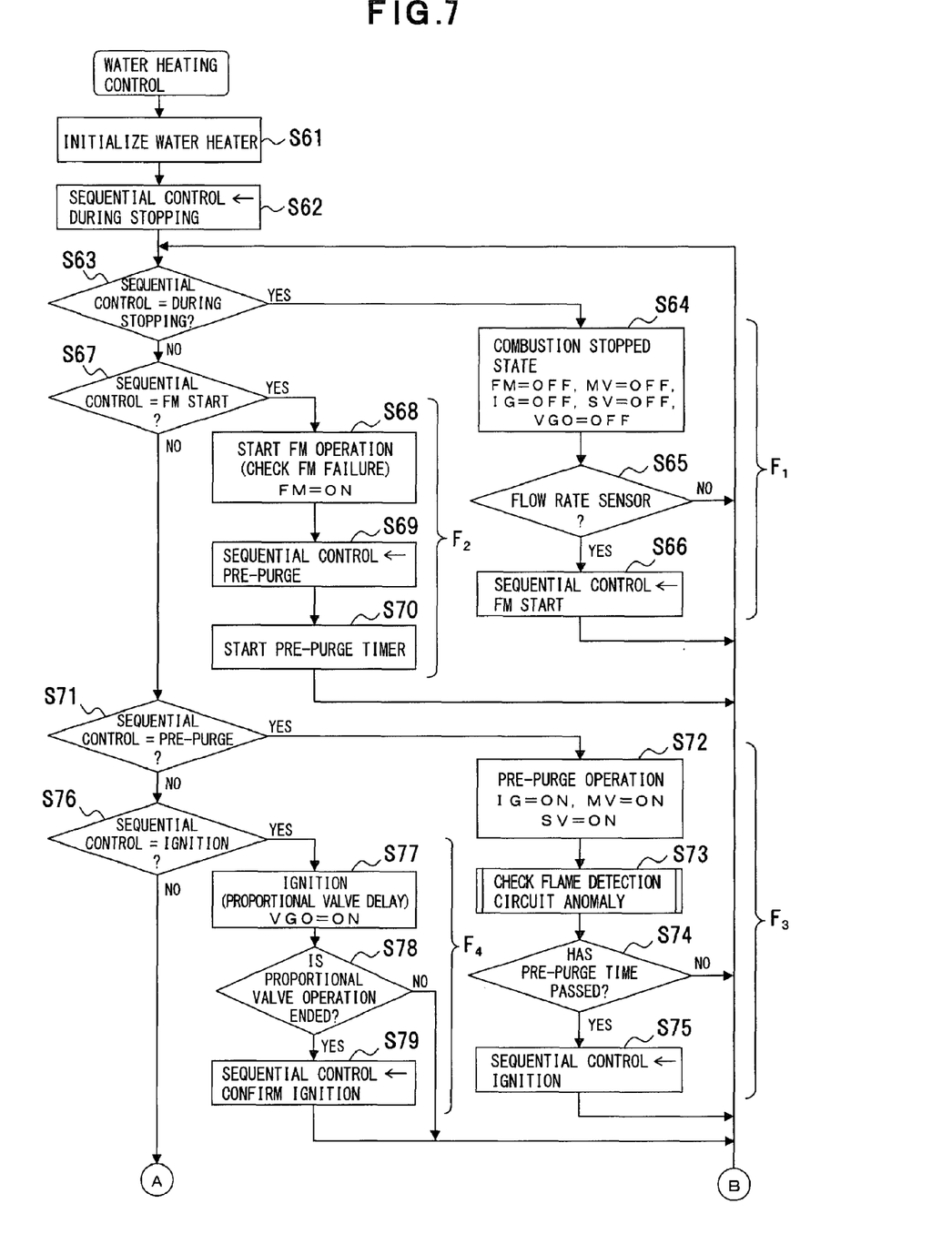
FIG. 7 depicts an example of a process of water heating control in a water heater according to a second embodiment.
Figure 8:
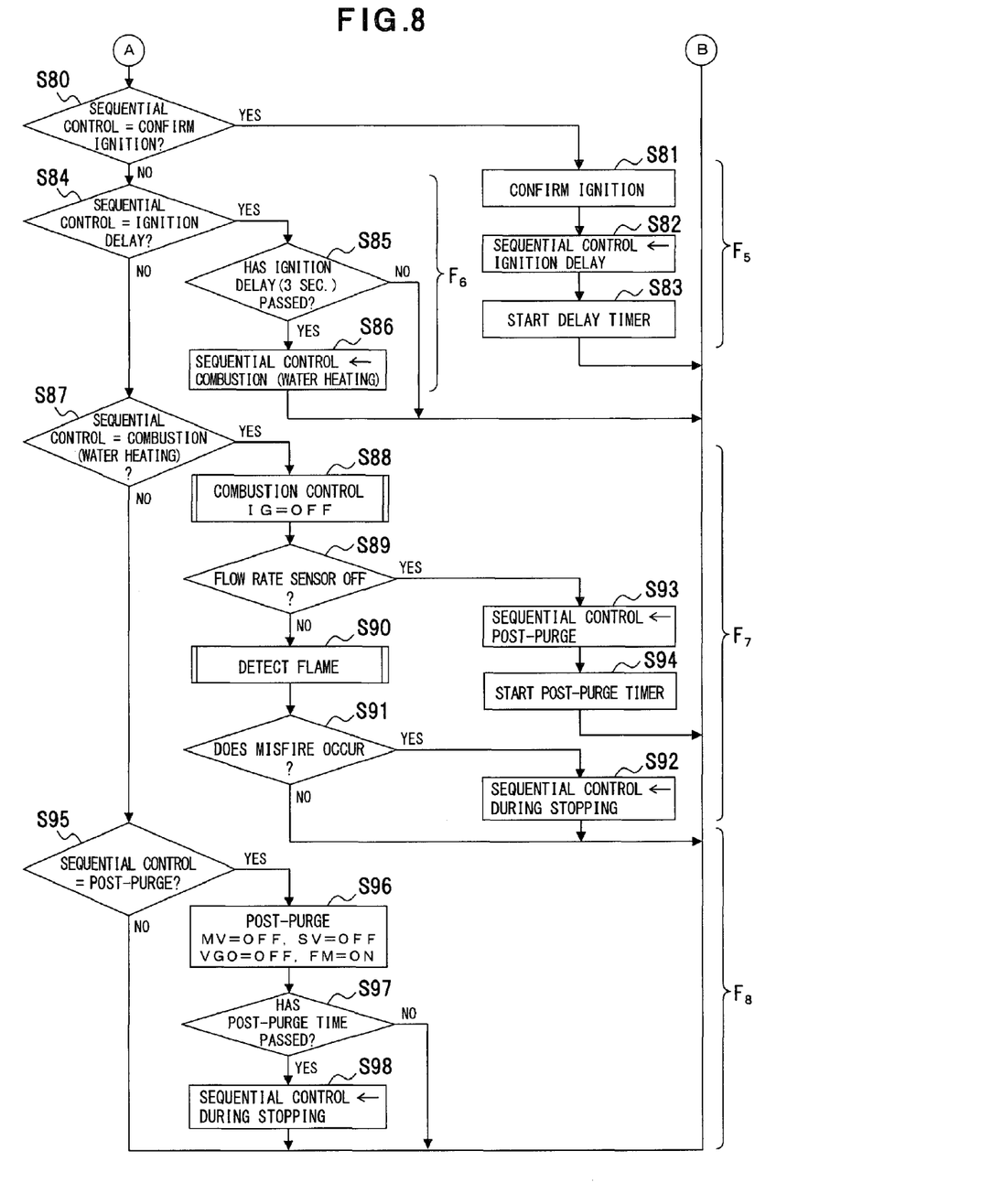
FIG. 8 depicts the example of the process of water heating control in the water heater according to the second embodiment.
Figure 9:
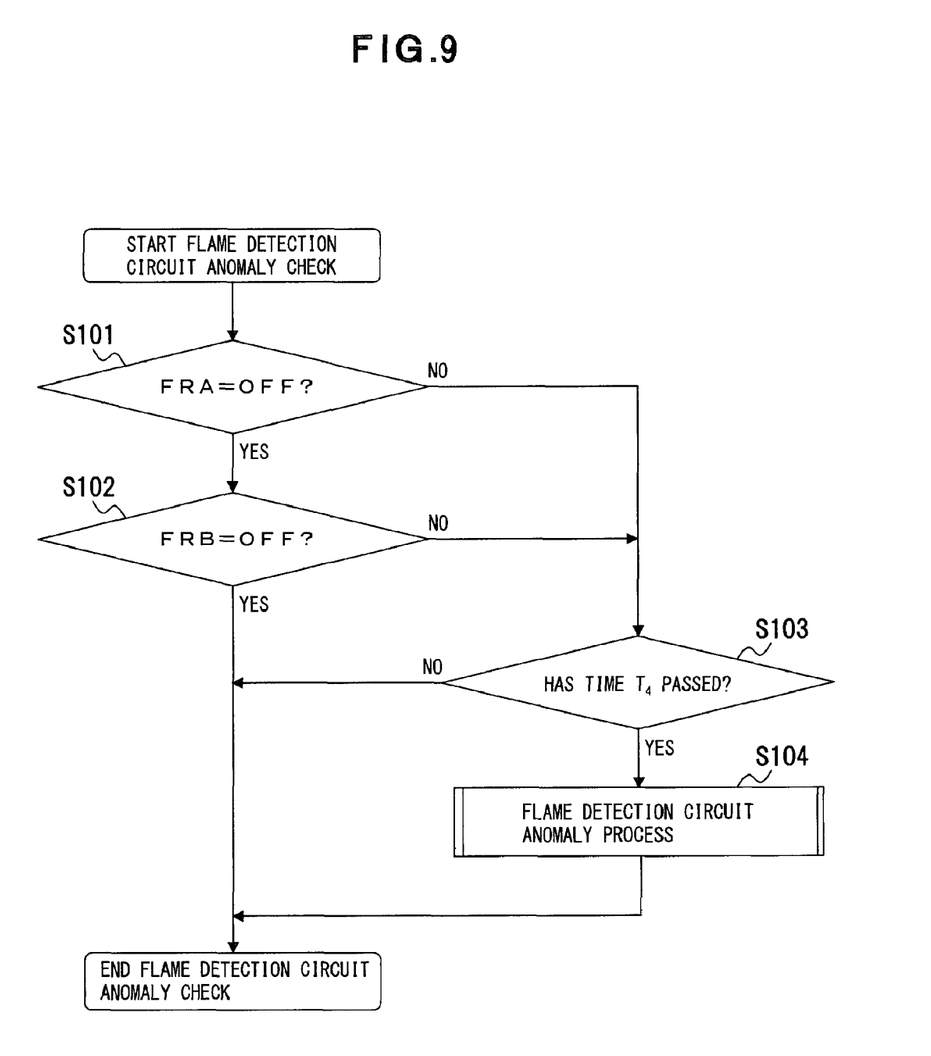
FIG. 9 depicts an example of a process of flame detecting circuit anomaly determination.

The second embodiment will be described with reference to FIGS. 7, 8 and 9. FIG. 7 depicts an example of a process of water heating control in a water heater according to the second embodiment, FIG. 8 depicts the example of the process of water heating control in the water heater according to the second embodiment and FIG. 9 depicts an example of a process of flame detecting circuit anomaly determination. A and B depicted in FIGS. 7 and 8 depict connectors of flowcharts. Processing contents, processing procedures, etc. depicted in FIGS. 7, 8 and 9 are an example, and do not limit the embodiment.

This water heating control is an example of a combustion control method of the present invention, and executes processes including combustion control, flame detecting control, monitoring control of combustion, etc. for the water heater 2 described in the above embodiment. In the water heating control, executed may be a process during stopping (F1), an FM start process (F2), a pre-purge process (F3), an ignition process (F4), an ignition confirmation process (F5), an ignition delay process (F6), a water heating combustion process (F7) and a post-purge process (F8).

If a power source of the water heater 2 is turned on, water heater initialization is executed such as initialization of an I/O, etc. and setting of an initial value of various settings (step S61). After that, sequential control representing a control state of the control device 6 of the water heater 2 is set in stopping (step S62). A driving state of the water heater 2 is determined at that time by a control command set in this sequential control, and control is executed.

(1) Process During Stopping (F1)

If sequential control is set in stopping (YES of step S63), the burner 18 is left combustion-stopped (step S64). In this time, the fan motor (FM) 32, the main gas valve (MV) 36, the igniter (IG) 26, the gas solenoid valve (SV) 38 and the gas proportional valve (VGO) 40 are controlled under an OFF state. If the flow rate sensor 44 is turned ON by water supply to the water heater 2 (YES of step S65), sequential control of FM start is set as start of a water heating operation (step S66), and the process returns to step S63.

(2) FM Start Process (F2)

If processing sequential control is changed from the stopping (NO of step S63) to the FM start process (YES of step S67), a failure check is executed that whether FM 32 is turned ON or not when operated (step S68). If there is no failure in FM 32, sequential control of a pre-purge is set (step S69) and the timer 58 is activated to start to time pre-purge time passing (step S70). Then, the process returns to step S63.

(3) Pre-Purge Process (F3)

If the processing sequential control is changed from FM start (NO of step S67) to a pre-purge process (YES of step S71), the igniter 26, the main gas valve 36 and the gas solenoid valve 38 are turned ON and a pre-purge operation is executed (step S72). In this pre-purge process, exhaustion of gas that does not burn, oil, etc. in the heat source device 4 and the gas supply pipe 34 is executed as a combustion preparing operation.

An anomaly check of a flame detection circuit is executed during the pre-purge process (step S73). In the anomaly checking process of a flame detection circuit, as depicted in FIG. 9, if both the flame rod 20 (FRA) and the flame rod 22 (FRB) do not detect a flame (YES of step S101 and YES of step S102), normalcy is determined. In this case, the burner 18 does not burn since fuel gas is not supplied although the igniter 26 is turned ON. Therefore, if a flame is detected in a state where there is no flame (NO of step S101 and No of step S102) and a predetermined time $T_4$, for example, 5 seconds have passed (YES of step S103), a flame detection circuit anomaly process is executed (step S104). In the flame detection circuit anomaly process, an informing process using a display unit of the water heater 2 may be executed, or the main gas valve 36 may be locked to forbid the burner 18 combustion.

When a predetermined pre-purge time has passed from timing of the timer 58 (YES of step S74), the pre-purge process is ended. Sequential control of an ignition process is set (step S75) and the process returns to step S63.

(4) Ignition Process (F4)

If a processing sequential control is changed from the pre-purge (NO of step S71) to the ignition process (YES of step S76), the ignition process is executed accompanying with the delay of opening or closing of the gas proportional valve 40 (step S77). In the ignition process, the opening degree of the gas proportional valve 40 is controlled so that the volume of fuel necessary for ignition is achieved. The fuel is supplied to the main gas valve 36 and the gas solenoid valve 38, which are already opened. The fan motor 32 blows air, and the igniter 26 is in an ON state. Thus, the burner 18 is ignited by the supplied fuel. If the gas proportional valve 40 is opened to a predetermined degree, operation is regarded as complete (YES of step S78). Sequential control of ignition confirmation is set (step S79) and the process returns to step S63.

(5) Ignition Confirmation Process (F5)

If the processing sequential control is changed from the ignition process (NO of step S76) to an ignition conformation process (YES of step S80), a flame of the burner 18 is detected by, for example, the flame rod 20 and ignition is confirmed (step S81). After the ignition confirmation, sequential control of ignition delay is set (step S82), the timer 58 is operated and timing delay time is started (step S83). The process returns to step S63.

(6) Ignition Delay Process (F6)

If the processing sequential control is changed from the ignition confirmation (NO of step S80) to an ignition delay process (YES of step S84), standing-by is maintained until delay time, for example, 3 [seconds] have passed from timing the passage of time by the timer 58 (step S85). In the ignition delay, combustion is stabilized by the standing-by of the delay time. When the delay time has passed (YES of step S85), sequential control of a combustion process for executing water heating is set (step S86) and the process returns to step S63.

(7) Water Heating Combustion Process (F7)

If the processing sequential control is changed from the ignition delay (NO of step S84) to a water heating combustion process (YES of step S87), combustion control for executing hot water supply at a set temperature is executed after the igniter 26 is turned OFF (step S88). If the flow rate sensor 44 detects the flow rate of supplied water W, that is, if there is a water heating request (NO of step S89), the flame detecting process described in the above embodiment is executed (step S90). If a misfire is determined by the flame detection process (YES of step S91), sequential control of stopping is set in order to stop the combustion of the burner 18 (step S92), and the process returns to step S63. If it is determined that there is a flame thus not a misfire (NO of step S91), the combustion process is continued. While the water heating request is continued, the flame detection process may be repeatedly executed.

If an end of the water heating request is detected by the detection of the flow rate sensor 44 (YES of step S89), a post-purge is set in sequential control in order to move to a water heating end process (step S93). At this time, the timer 58 is operated as a post-purge timer (Step S94) and the process returns to step S63.

(8) Post-Purge Process (F8)

If the processing sequential control is changed from the water heating combustion control (NO of step S87) to a post-purge process (YES of step S95), the main gas valve 36, the gas solenoid valve 38 and the gas proportional valve 40 are closed, the combustion of the burner 18 is stopped, and a post-purge is executed (step S96). At this time, the fan motor 32 is turned ON. Thereby, remaining gas, etc. can be removed by blowing outside air into and ventilating the heat source device 4 and the gas supply pipe 34 after extinction of the burner 18. When post-purge time has passed from timing by the timer 58 (YES of step S97), sequential control of stopping is set (step S98) and the process returns to step S63.

According to such a structure, a flame is detected by a plurality of flame detecting means and combustion is determined. Stopping combustion based on a determined result thereof can prevent an error of monitoring the combustion. Thus, the safety of a combustion apparatus can be improved. Flame detection is executed by a plurality of flame detecting means. Each flame detecting means uses a different detection criterion. Thereby, enhancement of the accuracy of monitoring combustion can be achieved. Executing anomaly monitoring of a flame detecting means before the start of the water heating combustion process can improve the safety of the combustion control.

Third Embodiment

Figure 10:
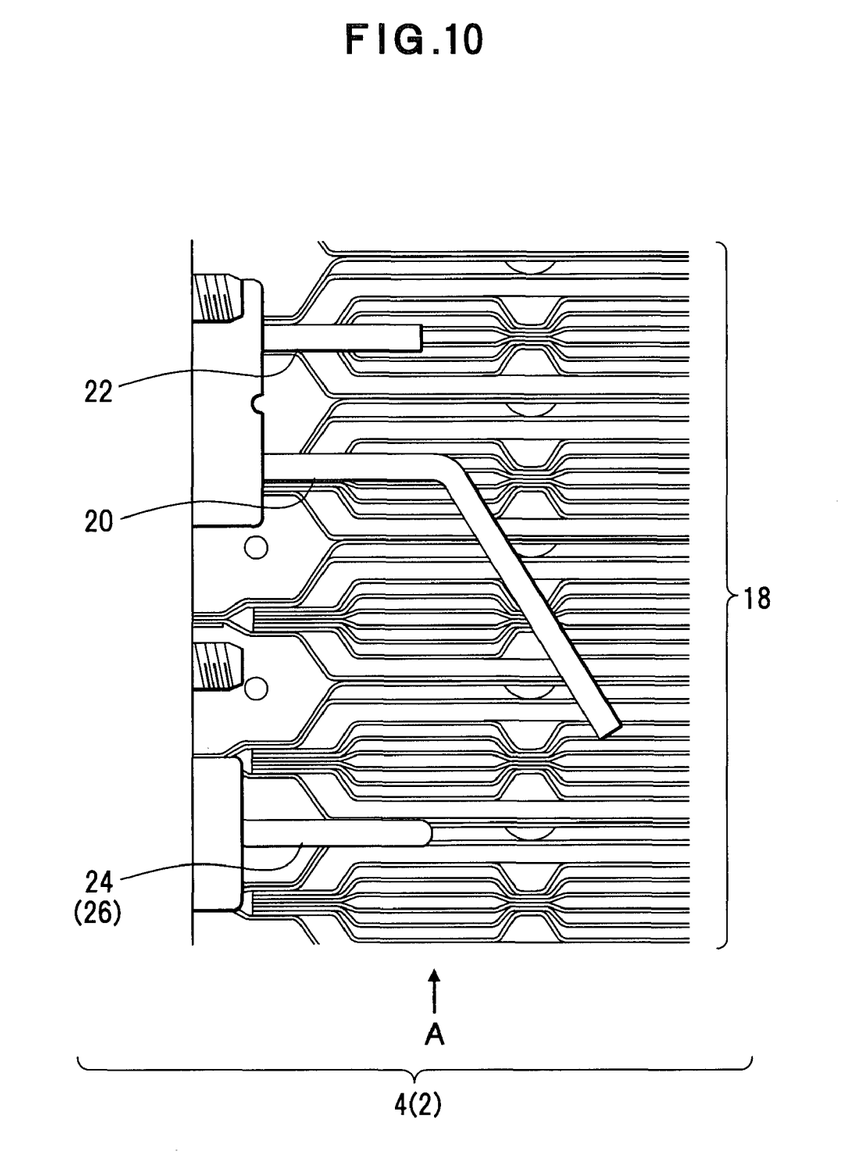
FIG. 10 depicts an example of disposing flame rods according to a third embodiment.
Figure 11:
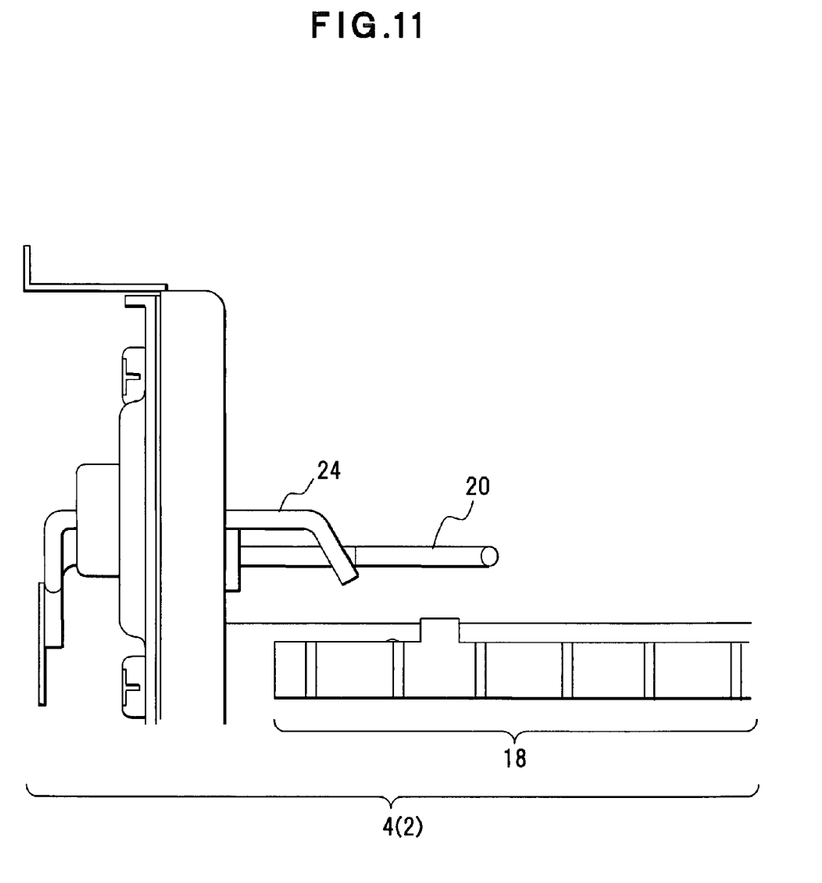
FIG. 11 is a view on arrow A of FIG. 10.

A third embodiment will be described with reference to FIGS. 10 and 11. FIG. 10 depicts an example of disposing flame rods according to the third embodiment and FIG. 11 is a view on arrow A of FIG. 10. The structure depicted in FIGS. 10 and 11 is an example, and does not limit the embodiment.

In the disposed example, as depicted in FIG. 10, inside a heat source 4, a short flame rod 22 is disposed facing a flame output surface of the burner 18, and a long flame rod 20 which is bent in parallel facing the flame output surface of the burner 18 is disposed. A spark plug 24 connected to an igniter 26 is further disposed as an ignition means of the burner 18.

The spark plug 24 and the flame rod 20 are, as depicted in FIG. 11, disposed at the side of the heat source device 4. The spark plug 24 is configured by being bent toward the burner 18. In the ignition process, discharging the spark plug 24 makes the burner 18 turn on. The flame rod 20 detects whether there is FR current or not by making the flame rod 20 touch a flame generated from the burner 18.

Example

Figure 12:
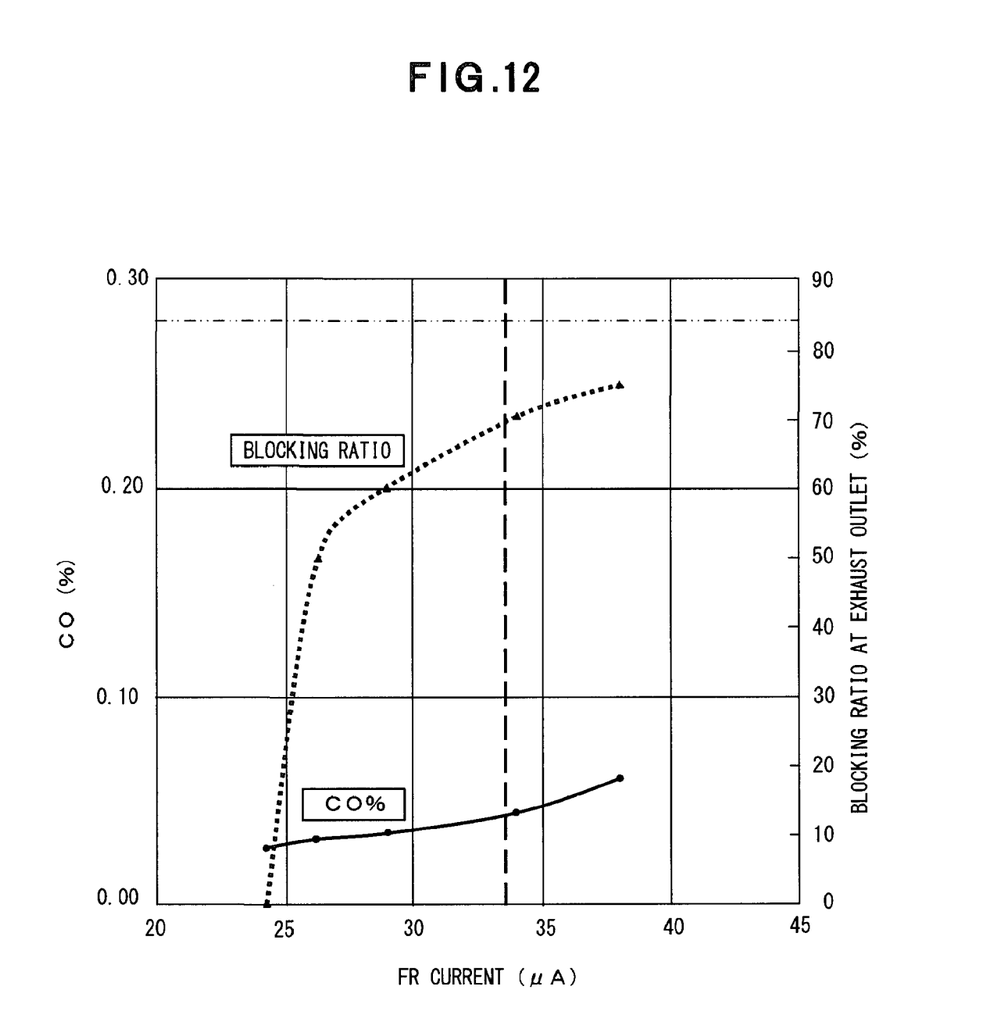
FIG. 12 depicts an example of a detecting process of carbon monoxide concentration and the blocking ratio at an exhaust outlet by a flame rod.

An example of detection by the flame rod 22 for air-fuel ratio control using as a second flame detecting means will be described with reference to FIG. 12.

In the water heater 2, monitoring the increase of carbon monoxide concentration and the blocking ratio at an exhaust outlet in the water heater 2, especially in the heat source device 4 is executed based on an FR current value detected by the flame rod 22. In the monitoring process, an FR current value is measured by the flame rod 22 during the execution of a normal water heating combustion process as described above. As depicted in FIG. 12, the monitoring process is executed based on determination information representing the relationship between the FR current value held in the ROM 54, etc. of the control device 6, and carbon monoxide concentration and the blocking ratio at an exhaust outlet. If the FR current value equal to or over a predetermined threshold value is detected, a combustion improvement process may be executed by adjustment of the opening degree of the gas proportional valve 40, etc. or rotating number control of the fan motor 32. An informing process may be executed using an informing means of the water heater 2.

Other Embodiments (1) In the above embodiments, the case is described that two flame rods 20 and 22 are provided as flame detecting means. The present invention is not limited thereto. That is, in the present invention, at least two flame detecting means may be provided, whether there is a flame or not may be determined based on a flame detected result by these detecting means, and the combustion control may be executed. If two or more detected results are different from each other, it may be determined there is not a flame, and fuel supply may be stopped to execute the combustion control.

(2) In the above embodiments, it is described that if the flame rod 20 which is FRA detects a flame during the water heating combustion of the water heater 2, flame detection using the flame rod 22 which is FRB is executed. The present invention is not limited thereto. If at least one flame detecting means does not detect a flame based on the flame detected results by FRA and FRB, a misfire may be determined. Such a structure can also achieve the objects of the present invention.

(3) In the above embodiments, the water heater 2 equipped with a downstream shutoff valve is described. The present invention is not limited thereto. The above flame detecting process may be applied to a water heater equipped with an upstream shutoff valve.

(4) In the above embodiments, the case is described that the water heater 2 executing heating the supplied water W is used. The present invention is not limited thereto. The present invention may be used for a reheating device that reheats water in a bathtub, a heater heating a heat medium using a burner, and the like.

While the most preferred embodiments of the present invention have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

The present invention includes the structure that a misfire of a combustion means is monitored by at least two flame detecting means and fuel supply to the combustion means is controlled. The present invention may apply to a water heater installed interior, a heat source device, etc., thus is useful.

What is claimed is:

1. A combustion apparatus, comprising:
 a combustion means for combusting fuel;
 at least two flame detecting means for detecting whether there is a flame or not in the combustion means;
 a determination unit for determining whether or not there is a misfire where the flame is not detected based on detected results of the at least two flame detecting means; and
 a control unit for stopping supply of the fuel to the combustion means in response to a determined result of the determination unit.

2. The combustion apparatus of claim 1, further comprising:
 a timing means,
 wherein the determination unit determines that the misfire is present if one of the flame detecting means detects the flame and another flame detecting means has not detected the flame for a predetermined time.

3. The combustion apparatus of claim 2, further comprising:
 an output means for outputting a state of the combustion apparatus,
 wherein the determination unit outputs a determined result of flame detection anomaly to the output means if any of the flame detecting means detects the flame after a predetermined time has passed since the supply of the fuel to the combustion means was stopped or before combustion of the combustion means is started, and
 wherein the output means outputs the determined result as information on the state of the combustion apparatus.

4. The combustion apparatus of claim 2, wherein the control unit executes a re-ignition process if at least one of the flame detecting means does not detect the flame after a predetermined time has passed since the supply of the fuel to the combustion means was stopped.

5. The combustion apparatus of claim 1, wherein at least one of the flame detecting means detects a value of current which passes through the flame, and the determination unit determines that the flame is not present in the combustion means if the value of current detected is under a threshold value.

6. The combustion apparatus of claim 1, wherein each of the at least two flame detecting means detects the flame based on different detection criterion.

7. The combustion apparatus of claim 6,
 wherein a first flame detection means of the at least two flame detecting means detects whether the flame is present based on electrical conduction of the flame, and
 wherein a second flame detection means of the at least two flame detecting means detects whether the flame is present based on current passing through the flame.

8. A combustion control method comprising:
 detecting whether or not there is a flame in a combustion means for combusting fuel by at least two flame detecting means for detecting whether there is the flame or not in the combustion means;

determining whether or not there is a misfire where the flame is not detected based on detected results of the at least two flame detecting means; and stopping supply of the fuel to the combustion means in response to a determined result.

9. The combustion control method of claim 8, further comprising:

timing passing time by a timing means for timing passing time; and determining that the misfire is present if a predetermined time has passed since one of the flame detecting means detects the flame and the other flame detecting means does not detect the flame.

10. The combustion control method of claim 9, further comprising:

outputting a determined result of flame detection anomaly to an output means for outputting a state of a combustion apparatus if any of the flame detecting means detects the flame after a predetermined time has passed since the supply of the fuel to the combustion means was stopped or before combustion of the combustion means is started; and outputting the determined result by the output means as information on the state of the combustion apparatus.

11. The combustion control method of claim 9, further comprising:

executing a re-ignition process if at least one of the flame detecting means does not detect the flame after a predetermined time has passed since the supply of the fuel to the combustion means was stopped.

12. The combustion control method of claim 8, further comprising:

detecting a value of current which passes through the flame; and determining that the flame is not present in the combustion means if the value of current detected is under a threshold value.

13. The combustion control method of claim 8, wherein each of the at least two flame detecting means detects the flame based on different detection criterion.

14. The combustion control method of claim 13, wherein a first flame detection means of the at least two flame detecting means detects whether the flame is present based on electrical conduction of the flame, and wherein a second flame detection means of the at least two flame detecting means detects whether the flame is present based on current passing through the flame.

15. A combustion apparatus comprising:

a burner that combusts fuel;

at least two flame detectors that detect whether there is a flame or not in the burner;

a determination unit that determines whether or not there is a misfire where the flame is not detected based on detected results of the at least two flame detectors; and a control unit that stops supply of the fuel to the burner in response to a determined result of the determination unit.

16. The combustion apparatus of claim 15, further comprising:

a timer, wherein the determination unit determines that the misfire is present if one of the flame detectors detects the flame and another flame detector has not detected the flame for a predetermined time.

17. The combustion apparatus of claim 16, further comprising:

an output unit that outputs a state of the combustion apparatus, wherein the determination unit outputs a determined result of flame detection anomaly to the output unit if any of the flame detectors detects the flame after a predetermined time has passed since the supply of the fuel to the burner was stopped or before combustion of the burner is started, and wherein the output unit outputs the determined result as information on the state of the combustion apparatus.

18. The combustion apparatus of claim 16, wherein the control unit executes a re-ignition process if at least one of the flame detectors does not detect the flame after a predetermined time has passed since the supply of the fuel to the burner was stopped.

19. The combustion apparatus of claim 15, wherein at least one of the flame detectors detects a value of current which passes through the flame, and the determination unit determines that the flame is not present in the burner if the value of current detected is under a threshold value.

20. A combustion control method comprising:

detecting whether or not there is a flame in a burner that combusts fuel by at least two flame detectors that detect whether there is a flame or not in the burner;

determining whether or not there is a misfire where the flame is not detected based on detected results of the at least two flame detectors; and stopping supply of the fuel to the burner in response to a determined result.

21. The combustion control method of claim 20, further comprising:

timing passing time by a timer that times passing time; and determining that the misfire is present if a predetermined time has passed since one of the flame detectors detects the flame and another flame detector does not detect the flame.

22. The combustion control method of claim 21, further comprising:

outputting a determined result of flame detection anomaly to an output unit that outputs a state of a combustion apparatus if any of the flame detectors detects the flame after a predetermined time has passed since the supply of the fuel to the burner was stopped or before combustion of the burner is started; and outputting the determined result by the output unit as information on the state of the combustion apparatus.

23. The combustion control method of claim 21, further comprising:

executing a re-ignition process if at least one of the flame detectors does not detect the flame after a predetermined time has passed since the supply of the fuel to the burner was stopped.

24. The combustion control method of claim 20, further comprising:

detecting a value of current which passes through the flame; and determining that the flame is not present in the burner if the value of current detected is under a threshold value.

* * * * *